United States Patent [19]

Alford et al.

[11] Patent Number: 5,174,913

[45] Date of Patent: Dec. 29, 1992

[54] POLYBASIC ACID ESTERS AS OIL FIELD CORROSION INHIBITORS

[75] Inventors: John A. Alford, Goose Creek; Paul G. Boyd, North Charleston; Eugene R. Fischer, James Island, all of S.C.

[73] Assignee: Westvaco Corporation, New York, N.Y.

[21] Appl. No.: 762,959

[22] Filed: Sep. 20, 1991

[51] Int. Cl.$^5$ .............................................. C23F 11/14
[52] U.S. Cl. ........................... 252/8.555; 252/389.62; 252/392; 422/16; 548/347.1; 544/107; 544/127; 544/156; 544/157
[58] Field of Search .............................. 548/335, 347; 252/8.555, 389.62, 392; 422/16; 554/107, 156, 157, 127

[56] References Cited

U.S. PATENT DOCUMENTS 4,179,457  12/1979  Crawford ........................... 554/157

Primary Examiner—Robert L. Stoll
Assistant Examiner—Valerie Fee
Attorney, Agent, or Firm—Daniel B. Reece, IV; Terry B. McDaniel; Richard L. Schmalz

[57] ABSTRACT

A corrosion inhibitor with excellent film forming and film persistency characteristics may be produced by first reacting in a condensation reaction a polybasic acid with a polyalcohol to form a partial ester. The partial ester is reacted with imidazoline and/or fatty diamines to salt the ester. If warranted, the salted partial ester may be reacted with a metal hydroxide, a metal oxide, and/or ammonia to further salt the ester. Surfactants may be added to tailor the inhibitor formulation to meet the specific needs of the user (i.e., the corrosion inhibitor may be formulated to produce an oil-soluble, highly water-dispersible corrosion inhibitor or an oil-dispersible, water-soluble corrosion inhibitor). Suitable carrier solvents may be employed where needed to effectively disperse the corrosion inhibitor formulation.

31 Claims, No Drawings

POLYBASIC ACID ESTERS AS OIL FIELD CORROSION INHIBITORS

FIELD OF INVENTION

This invention relates to inhibiting corrosion of metals in oil field applications where hydrocarbons and water are being taken from producing wells. Water can lead to corrosion of metal piping, etc., which is used in downhole applications. It is, therefore, necessary to add a suitable agent to the oil/water medium to effectively reduce or eliminate problems which are associated with corrosion of metallic parts. Failure to do so can result in extensive corrosion of metal in the field leading to expensive repair and lost productivity.

BACKGROUND OF THE INVENTION

The oil industry has traditionally employed oil-soluble dimer acid based corrosion inhibitors to reduce corrosion in oil well piping. These inhibiting formulations commonly consist of materials which are produced by the thermal condensation of functionalized $C_{18}$ fatty acids (containing one or two double bonds, e.g., oleic and linoleic, respectively). Examples of well known methods by which the thermal polymerization of fatty acids occur include heating an appropriate fatty acid mixture (e.g., tall oil fatty acid or soya fatty acid) in the presence of a clay or other suitable catalyst to give varying amounts of $C_{36}$ (dimerized) and $C_{54}$ (trimerized) fatty acids. These dimer and/or trimer fatty acids are neutralized with an appropriate amine (generally a diethylenetriamine, or DETA) derived fatty acid imidazoline to produce a corrosion inhibitor. These inhibitors are oil-soluble with minimum water dispersibility and act by coating metal surfaces (via adsorption by polar groups), thereby excluding the water which is necessary for the corrosion process to occur.

However, over the past few years several factors have caused the oil industry to reevaluate its traditional preference for oil-soluble water-dispersible corrosion inhibitors. Currently, many oil wells are producing mixtures higher in water content than in oil. Efficiency could be improved by utilizing the majority fluid in these wells as the carrier for the inhibitor. Also, water (and dissolved earth minerals) is the medium which causes electrochemical corrosion in oil and gas pipelines. If one could effectively disrupt the corrosion cycle at its source, one should have a more effective inhibitor. Finally, the carrier solvent constitutes about 70% of a standard corrosion inhibitor package. Replacing the traditional heavy aromatic napthas and other hydrocarbon solvents with water would eliminate the environmental damage caused by using hydrocarbon solvents—while also reducing costs.

Thus, the developing trend in the oil industry is to switch from oil-soluble delivery systems for corrosion inhibitors to water-soluble delivery systems. This is evidenced by the increasing number of companies which require corrosion inhibitors to be evaluated via linear polarization resistance meters (which test for inhibition in pure aqueous systems rather than the traditional hydrocarbon/aqueous systems).

In order to increase their water-dispersibility, conventional oil-soluble dimer/trimer mixtures have been coformulated with both fatty acid imidazolines and a variety of surfactants. However, this approach has proven limited in its scope. The use of enough surfactant to render the dimer/trimer molecule water-soluble results in drastically reduced film formation and film persistency. That is, the corrosion inhibitor simply washes-off the metal, leaving it unprotected. Also, these highly surfacted packages have a tendency to emulsify under downhole conditions, resulting in major problems for the user.

Water-soluble corrosion inhibitors which are currently available include alkyl pyridine quaternary compounds (generally benzyl quats), imidazoline salts (with acetic acid), and imidazoline ethoxylates. Although these inhibitors have found limited use in oil and gas pipelines, they have not yet proven tenacious enough to successfully inhibit corrosion when utilized under the dynamic downhole conditions prevalent in producing oil wells.

Therefore, it is the object of this invention to provide an effective and economical oil field corrosion inhibitor capable of being manufactured as either a highly water-dispersible molecule or as a water-soluble molecule. These molecules can be formulated to yield oil-soluble, highly water-dispersible corrosion inhibitor packages or oil-dispersible, water-soluble corrosion inhibitor packages, based upon the specific individual needs of the user. Other objects, features, and advantages will be evident from the following disclosures.

SUMMARY OF THE INVENTION

The object of this invention is met by first reacting in a condensation reaction a polybasic acid with a polyalcohol to form a partial ester. This partial ester is reacted with imidazoline and/or fatty diamines to form a salt. If necessary, the salted partial ester can be partially or fully neutralized with a metal hydroxide, a metal oxide, and/or ammonia. Surfactants and/or a suitable carrier solvent may be added to produce a corrosion inhibitor package formulation that is either oil-soluble, highly water-dispersible or oil-dispersible, water-soluble . . . depending upon the requirements of the user.

The downhole conditions in an oil or gas well can vary greatly from one well to the next. That is, the environment may be "sweet" ($CO_2$) or "sour" ($H_2S$), the water to oil ratios may change, and the mineral content of the water may vary. However, the above corrosion inhibitor packages can be formulated to meet the specific requirements of these varied environments. Furthermore, the inhibitors maintain the ability to form protective films with excellent persistency on metal surfaces under a wide spectrum of conditions.

Traditionally, it has been generally accepted by those skilled in the art that the imparted corrosion protection is proportional to the concentration of imidazoline carboxylate salt in the inhibitor. In the case of the polybasic acid partial esters described herein, at equivalent concentrations the imidazoline carboxylate salt concentration is reduced by as much as 50%—yet corrosion protection is equal to or better than analogous polybasic acid-imidazoline formulations of equal total component concentrations.

Indeed, the formulated polybasic acid partial esters exhibited both greatly improved water dispersibility or solubility and improved corrosion inhibition (i.e., film persistency) over the current standard industry corrosion inhibiting formulations (both oil-soluble and water-soluble). Also, the dosage required to provide the industry standard of 90% corrosion protection or greater is significantly reduced.

DESCRIPTION OF THE PREFERRED EMBODIMENT

The versatile corrosion inhibiting molecule may be represented by the following chemical structures:

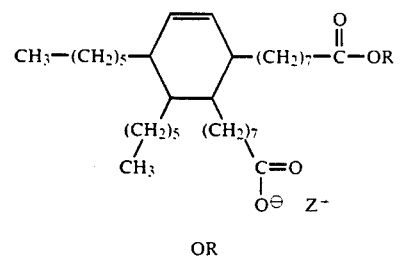

OR

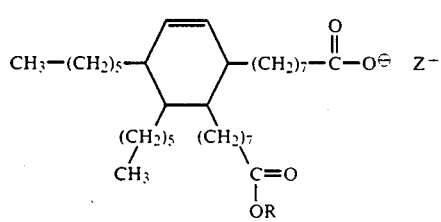

where R is a polyalcohol (or combinations of polyalcohols) and $Z^+$ is imidazoline and/or fatty diamines.

A preferred process which produces the corrosion inhibitor first reacts (in a condensation reaction) one or more polybasic acids with one or more polyalcohols to form a partial ester with a low acid number (i.e., from 15 to 155). The partial ester is reacted with imidazoline and/or fatty diamines to form a salt. The resulting salted ester may be reacted with a metal hydroxide, a metal oxide, and/or ammonia to further salt the ester. Various surfactants may be added to produce an inhibitor formulation tailored to meet the needs of the user. Where necessary, a suitable carrier solvent may be employed to disperse the corrosion inhibitor.

The final water-solubility of the corrosion inhibiting ester (e.g., whether it is water-dispersible or water-soluble) will depend upon the degree of both the esterification and salting of the molecule, the amount and character of surfactants added to the formulation, and the amount and character of the carrier solvent utilized. The molecular weight and hydrophilic character of the reacting polyalcohol largely determines the resulting degree of esterification. The corrosion inhibiting ester in the present invention has a range of esterification from 35-71%, with the preferred range being 45-60%. The degree of salting of the molecule is directed by the choice of amine (i.e., its hydrophilic/hydrophobic nature), metal, or ammonia derivative used. Here, a range of 15-32% by weight of the molecule is salted with imidazoline, fatty diamines, or combinations thereof (with a preferred range of 18-28% by weight). This salted ester may be further reacted with 5-10% by weight of a metal hydroxide, a metal oxide, ammonia, or combinations thereof to further salt the molecule.

Polybasic acids which are suitable for use in producing the inhibitor include $C_{16}$-$C_{36}$ dimerized fatty acids, $C_{24}$-$C_{54}$ trimerized fatty acids, and the like. These polybasic acids may contain certain levels of impurities (i.e., monomers, tetramers, etc.) and still be suitable for use. However, too high a level of monomers (about 25% or more) will adversely affect corrosion inhibition.

Polyalcohols which are suitable for use in producing the inhibitor include, but are not limited to, the following:
  ethylene glycol
  diethylene glycol
  triethylene glycol
  polyethylene glycol
  glycerin,
  pentaerythritol,
  trimethylolpentane, and
  sorbitol.
Combinations of these polyalcohols may also be suitable for use.

These lists are intended to be representative and it will be obvious to those skilled in the art that a variety of other polybasic acids and polyalcohols can be used. Therefore, other polybasic acids and polyalcohols suitable for use in the reaction can be considered part of this invention when used with the described composition of matter below.

Proper metal hydroxides and metal oxides for use in producing the inhibitor include derivatives of lithium, potassium, and sodium.

Surfactants which are suitable for use with the inhibitor include, but are not limited to, the following:

(a) fatty acid ethoxylates having a chemical structure of

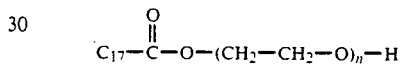

where n is an integer between 4 and 20, (b) nonylphenol ethoxylates having a chemical structure of

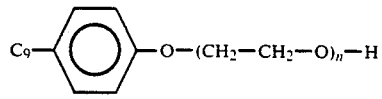

where n is an integer between 4 and 20, (c) alcohol ethoxylates having a chemical structure of

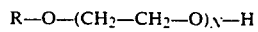

where R is $C_{12}$-$C_{18}$ and n is an integer between 4 and 20, and (d) dodecylbenzenesulfonates having a chemical structure of

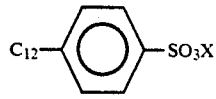

where X is a metal, amine or ammonia.

Depending upon the water-dispersibility or solubility of the corrosion inhibitor and the environment in which the inhibitor is to be used, suitable carrier solvent formulations may include hydrocarbons, water, and/or alcohols.

It is within the ability of a skilled artisan to utilize a condensation reaction to produce an ester with a desired degree of esterification. The condensation reaction to produce a partial ester may be conducted at a temperature range of 165° C.-238° C. until the water of reaction is removed. The ionic reaction with imidazoline (or the like) to produce the salted partial ester may be conducted at a temperature range of 38° C.–94 C. for a period of between 0.5 and 2.0 hours. The ionic reaction with the metal hydroxide (or the like) to further salt the partial ester may be conducted at a temperature range of 38° C. –94° C. for a period of between 0.5 and 2.0 hours.

The following examples are provided to further illustrate the present invention and are not to be construed as limiting the invention in any manner.

EXAMPLE 1

An oil-soluble, highly water-dispersible corrosion inhibitor was produced via the following method. To a clean reactor was charged 92.0% by weight of DTC-195. (DTC-195 is a 95% polymer formulation consisting of $C_{36}$ dimerized fatty acid and $C_{54}$ trimerized fatty acid in a 2:1 ratio, manufactured by Westvaco.) To the DTC-195 was added (with agitation) 7.5% by weight of diethylene glycol and 0.5% by weight of paratoluenesulfonic acid (a well-known catalyst for condensation reactions). The solution was slowly heated to a top temperature of about 171° C. As water began forming at approximately 115° C., it was important to apply enough $N_2$ sparge to remove the water from the reactor. The top temperature was held for about one hour (until the condensation reaction is driven to completion). The corrosion inhibitor (hereafter referred to as CI-#1) was allowed to cool before being removed from the reactor. For testing purposes, the various amounts of CI-#1 were incorporated into a standard corrosion inhibitor formulation (hereafter referred to as CIF-#1) consisting of:

19.2% CI-#1
5.8% Witcamine® 209 (Imidazoline formulated from a 1:1 molar ratio of tall oil fatty acid and diethylenetriamine, manufactured by Witco, Inc.)
3.0% Isopropanol
2.0% Witconate® 605A (an oil-soluble calcium dodecylbenzenesulfate manufactured by Witco, Inc.)
70.0% HANS (Heavy Aromatic Naphtha Solvent)

Testing procedures on this corrosion inhibitor (and on all the corrosion inhibitors tested) were performed in a wheel oven which provides for a constant temperature and rotation rate of sample bottles. This emulates downwell conditions with both oil and water environments and high temperatures. Normal testing procedures call for sparging sea salt solution and kerosene with $CO_2$ until saturated. Metal coupons are cleaned in acetone, dried, and put into the testing bottles. The corrosion inhibitor formulation is added subsequently added to the bottles. The bottles are sparged for several minutes with $CO_2$, and equal amounts of kerosene and salt water. The bottles are capped, put into a wheel oven, and rotated through 360° to insure that each end of the metal coupon is exposed to both aqueous and oil environments. After this treatment has continued for one to two hours at 150° F., the coupons are removed and placed in a second set of bottles containing kerosene/salt water. These bottles are rotated for one hour; the coupons are removed a second time and again placed in a kerosene/salt water mixture and rotated at 150° F. for 22 hours to test for ultimate film persistency. After the treatment is complete, the metal coupons are removed from the bottles, rinsed in a 50/50:v/v:water/-concentrated HCl mixture containing additional acid corrosion inhibitor, rinsed first in distilled water and finally in isopropyl alcohol. The metal coupons are subsequently dried by manual wiping. The coupons are weighed, and the percent protection is reported according to the equation:

$$\% \text{ Protection} = \frac{A - B}{A} \times 100$$

A = Weight loss of blank coupons
B = Weight loss of inhibited coupons
The results are shown in Table I below.

TABLE I

| % Protection | CIF-#1 | | |
|---|---|---|---|
| | 750 ppm | 1500 ppm | 2500 ppm |
| CIF-#1 + no A | 85.7 | 94.0 | 94.5 |
| CIF-#1 + 0.25% A | 81.6 | 89.8 | 93.8 |
| CIF-#1 + 0.5% A | 81.8 | 91.8 | 91.8 |
| CIF-#1 + 1.0% A | 75.8 | 92.1 | 93.4 |

A) TMO-14: Tall oil monoleate surfactant with 14 mole ethoxylate, manufactured by the Stephen Chemical Company (13.4 HLB).

It should be noted that all wheel testing described in the Examples were conducted in highly aqueous environments (e.g. 10/90:v/v:oil/water) unless otherwise indicated. Also, the level of corrosion protection which the oil industry considers desirable is 90% or greater. For film persistency wheel testing, the generally accepted industry dosage for corrosion inhibitors (to yield the 90% protection) is 10,000 ppm, with a dosage of 5,000 ppm being considered a good inhibitor and 2,500 ppm considered an excellent one. Here, we see that either the inhibitor, or a combination of the inhibitor and a surfactant (both at a 10:90/oil:water ratio), yields testing results indicating excellent corrosion inhibition properties.

EXAMPLE 2

A preferred corrosion inhibitor was produced wherein 94.6% by weight of DTC-195 was reacted with 4.9% by weight of ethylene glycol and 0.5% by weight of para-toluenesulfonic acid (as a catalyst) in a condensation reaction following the procedure outlined in Example 1 above. For testing purposes, various amounts of the resulting corrosion inhibitor (hereafter referred to as CI-#2) were incorporated into a standard corrosion inhibitor formulation (hereafter referred to as CIF-#2) consisting of:

9.4% CI-#2
5.6% Witcamine® 209
3.0% Isopropanol
2.0% Witconate® 605A and
0.0% HANS,
and submitted to wheel testing. The results are listed in Table II below.

TABLE II

| % Protection | CIF-#2 | | | | |
|---|---|---|---|---|---|
| | 750 ppm | 1500 ppm | 2500 ppm | 5000 ppm | 10000 ppm |
| CIF-#2 + 1% A | 89.1 | 94.5 | 95.9 | 94.3 | 91.7 |
| CIF-#2 + 3% A | — | 93.8 | 94.0 | — | — |
| CIF-#2 + 1% B | 89.3 | 94.6 | 95.5 | — | — |

TABLE II-continued

| % Protection | CIF-#2 | | | | |
|---|---|---|---|---|---|
| | 750 ppm | 1500 ppm | 2500 ppm | 5000 ppm | 10000 ppm |
| CIF-#2 - 3% B | — | 94.1 | 93.8 | — | — |

A) TMO-14: Tall oil monoleate surfactant with 14 mole ethoxylate, manufactured by the Stephen Chemical Company (13.4 HLB).
B) MT-615: Mixed tall oil acid containing 28-30% rosin with 15 mole ethoxylate, manufactured by the Stephen Chemical Company (13.7HLB).

In all cases shown, the test results were obtained in a highly aqueous environment (e.g. 10/90:v/v:oil/water). Here, the results indicate excellent corrosion inhibition properties.

A comparative dispersion test was run between formulations of CIF-#1, CIF-#2, and a traditional standard corrosion inhibiting formulation of polybasic acid and imidazoline. One percent solutions of the formulated corrosion inhibitors were added to 10% concentrations of aqueous brine. The results were recorded in Table III below.

TABLE III

| | Comparative Dispersions | | | |
|---|---|---|---|---|
| Formulation | % Dispersed Initial Time | % Dispersed 15 Minutes | % Dispersed 30 Minutes | % Dispersed 60 Minutes |
| PA + IF | DID NOT DISPERSE | | | |
| CIF - #1 | 100% | 70% | 30% | — |
| CIF - #2 | 100% | 90% | 80% | 30% |

PA + IF: Dimer/trimer fatty acid neutralized with imidazoline.

The oil-soluble standard dimer/trimer and imidazoline formulation would not disperse in the 10% aqueous brine. However, both the CIF-#1 and CIF-#2 formulations easily dispersed in the brine, and gradually fell out of solution in the static system. These results graphically illustrate how the choice of polyalcohols can influence the degree of solubility of the formulation.

EXAMPLE 3

A corrosion inhibitor was produced wherein 93.9% by weight of Westvaco ® 1500 (a tall-oil derived dimer/trimer fatty acid mixture manufactured by Westvaco) was reacted with 5.6% by weight of glycerol and 0.5% by weight of para-toluenesulfonic acid (a catalyst) in a condensation reaction following the procedure outlined in Example 1 above. For testing purposes, various amounts of the resulting corrosion inhibitor (hereafter referred to as CI-#3) were incorporated into a standard corrosion inhibitor formulation (hereafter referred to as CIF-#3) consisting of:
  19.2% CI-#3
  5.8% Witcamine ® 209
  3.0% Isopropanol
  2.0% Witcamine ® 605A and
  0.0% HANS.

A traditional oil-soluble corrosion inhibitor was produced for comparison purposes by neutralizing Westvaco ® 1500 dimer/trimer with imidazoline. This corrosion inhibitor formulation consisted of:
  12.5% Westvaco ® 1500
  12.5% Witcamine ® 209
  3.0% Isopropanol
  2.0% Witcamine ® 605A and
  70.0% HANS.

Both formulations were submitted to wheel testing in a 90:10/aqueous:oil environment. The results of are listed in Table IV below.

TABLE IV

| % Protection | CIF-#3 | | | |
|---|---|---|---|---|
| | 750 ppm | 1500 ppm | 2500 ppm | 5000 ppm |
| OS | — | 60.1 | 44.6 | 54.7 |
| CIF-#3 | 91.5 | 95.7 | 96.1 | — |

The results indicate that the ester-based corrosion inhibitor formulation greatly outperformed a traditional corrosion inhibitor formulation based upon the same dimer/trimer fatty acid.

EXAMPLE 4

A corrosion inhibitor was produced wherein 93.8% by weight of DTC-195 was reacted with 5.7% by weight of glycerol and 0.5% by weight of para-toluenesulfonic acid (as a catalyst) in a condensation reaction following the procedure outlined in Example 1 above. The inhibitor is hereafter referred to as CI-#4.

Following the wheel testing procedure outlined in Example 1, a series of comparison tests were conducted in both a 90:10/aqueous:oil environment and a 100% aqueous environment between equivalent amounts of a formulation containing the highly water-dispersible CI-#4, a standard oil-soluble corrosion inhibitor formulation, and a standard water-soluble corrosion inhibitor formulation. The water in both environments was cut with a 10% NACE brine. The CI-#4 was incorporated into a standard corrosion inhibitor formulation (hereafter referred to as CIF-#4) consisting of:
  9.4% CI-#4
  5.6% Witcamine ® 209
  3.0% Isopropanol
  2.0% Witconate ® 605A, and
  0.0% HANS.

The oil-soluble corrosion inhibitor formulation (OSF) consisted of:
  2.5% DTC-295 (a polymerized dimer/trimer fatty acid manufactured by Westvaco)
  12.5% Witcamine ® 209
  3.0% Isopropanol
  2.0% Witconate ® 605A, and
  70.0% HANS.

The water-soluble corrosion inhibitor formulation (WSF) consisted of:
  50.0% JETCO S-50 (a quaternary ammonium compound manufactured by Jetco, Inc.)
  32.0% Isopropanol
  18.0% Water.

The results are listed in the respective tables below.

TABLE VI

| | 90:10 Water:Oil Comparison | | |
|---|---|---|---|
| ppm | OSF | CIF-#4 | WSF |
| 750 | 92.7 | 93.5 | <25.0 |
| 1500 | 94.0 | 93.0 | <25.0 |
| 2500 | 92.0 | 93.2 | <25.0 |
| 5000 | — | — | <25.0 |

TABLE VII

| ppm | 100% Water Comparison | | |
|---|---|---|---|
| | OSF | CIF-#4 | WSF |
| 750 | 65.0 | 74.1 | <25.0 |
| 1500 | 66.6 | 79.4 | <25.0 |
| 2500 | 70.5 | 84.3 | <25.0 |
| 5000 | 75.2 | 85.8 | <25.0 |

When compared to the oil-soluble formulation in the dynamic wheel testing environment, CIF-#4 exhibited equivalent corrosion inhibiting properties in the aqueous/hydrocarbon environment and superior inhibiting properties in the aqueous environment. Under dynamic testing, the CIF-#4 formulation was far superior in both environments when compared to the water-soluble formulation (which consistently measured less than 25% corrosion protection).

EXAMPLE 5

An oil-soluble, highly water-dispersible corrosion inhibitor was produced via the following method. To a clean reactor was charged 93.5% by weight of DTC-195. (DTC-195 is a 95% polymer formulation consisting of $C_{36}$ dimerized fatty acid and $C_{54}$ trimerized fatty acid in a 2:1 ratio, manufactured by Westvaco.) To the DTC-195 was added (with agitation) 0.69% by weight of ethylene glycol, 1.88% by weight of diethylene glycol, 1.88% by weight of glycerol, 1.88% by weight of trimethanolpropane, and 0.2% by weight of para-toluenesulfonic acid. The solution was slowly heated to a top temperature of about 193° C. As water began forming at approximately 150° C., it was important to apply enough $N_2$ sparge to remove the water from the reactor. The top temperature was held for about one hour (or until the condensation reaction is driven to completion). The corrosion inhibitor (hereafter referred to as CI-#5) was allowed to cool before being removed from the reactor. The CI-#5 was incorporated into a corrosion inhibitor formulation (hereafter referred to as CIF-#5) consisting of:

19.2% CI-#5
5.8% Witcamine ® 209
3.0% Isopropanol
2.0% Witconate ® 605A
70.0% HANS The CIF-#5 formulation yielded excellent results upon testing.

Although in the above examples the various corrosion inhibitors were formulated for (and tested in) dynamic environments consistent with the strenuous conditions found in the practice of downhole drilling, it should be noted that the inhibitors will perform equally well in preventing corrosion when utilized in other, usually less strenuous, applications (i.e., oil and gas pipelines, finished goods pipelines, automobile radiators, etc.). Indeed, many modifications and variations of the present invention will be apparent to one of ordinary skill in the art in light of the above teaching. It is understood therefore that the scope of the invention is not to be limited by the foregoing description but rather is to be defined by the claims appended hereto.

What is claimed is:

1. A composition of matter comprising the general chemical structure:

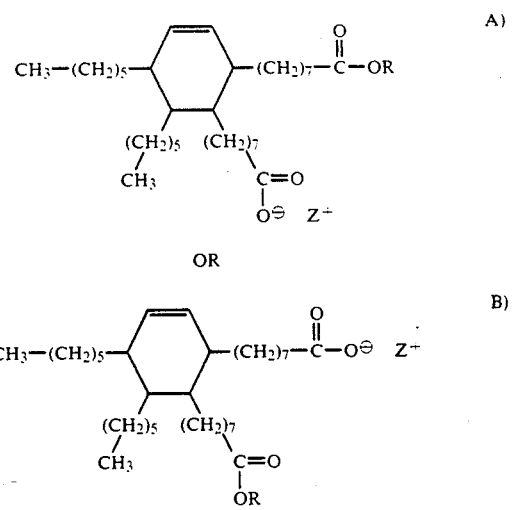

where R is a polyalcohol and $Z^+$ is a member of the group consisting of imidazoline, fatty diamines, or combinations thereof.

2. The composition of matter of claim 1 wherein the polyalcohol is selected from the group consisting of ethylene glycol, diethylene glycol, triethylene glycol, polyethylene glycol, glycerin, sorbitol, pentaerythritol, trimethylolpentane, and combinations thereof.

3. The composition of matter of claim 1 wherein the imidazoline, fatty diamines, or combinations thereof is reacted with a member selected from the group consisting of a metal hydroxide, a metal oxide, ammonia, or combinations thereof.

4. A method for inhibiting corrosion in metal which is in contact with an aqueous medium by coating said metal with a formulation consisting of the composition of matter of claim 1.

5. A process for the production of a corrosion inhibitor which comprises:
  (a) reacting in a condensation reaction a polybasic acid with a polyalcohol to form a partial ester which is from 35 to 71% esterified; and
  (b) reacting in an ionic reaction said partial ester with 15 to 32% by weight of a member selected from the group consisting of imidazoline, fatty diamines, or combinations thereof, thereby salting the partial ester to form a corrosion inhibitor.

6. The process of claim 5 which comprises: p1 (a) reacting in a condensation reaction a polybasic acid with a polyalcohol to form a partial ester which is from 45 to 60% esterified; and
  (b) reacting in an ionic reaction said partial ester with 18 to 28% by weight of a member selected from the group consisting of imidazoline, fatty diamines, or combinations thereof, thereby salting the partial ester to form a corrosion inhibitor.

7. The process of claim 5 which comprises, reacting in an ionic reaction the salted partial ester with 5 to 10% by weight of a member selected from the group consisting of a metal hydroxide, a metal oxide, ammonia, or combinations thereof, thereby further salting the partial ester to form a corrosion inhibitor.

8. The process of claim 7 wherein the metal contained in the metal hydroxide or metal oxide is selected from the group consisting of lithium, potassium, and sodium.

9. The process of claim 7 which comprises employing a surfactant or combination of surfactants in an admixture with said corrosion inhibitor.

10. The process of claim 9 wherein the surfactant is selected from the group consisting of:
(a) fatty acid ethoxylates having a chemical structure of

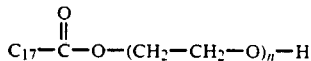

where n is an integer between 4 and 20;
(b) nonylphenol ethoxylates having a chemical structure of

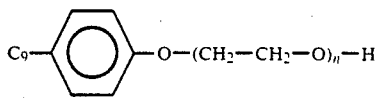

where n is an integer between 4 and 20;
(c) alcohol ethoxylates having a chemical structure of

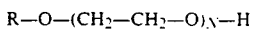

where R is $C_{12}$-$C_{18}$ and n is an integer between 4 and 20;
(d) dodecylbenzenesulfonates having a chemical structure of

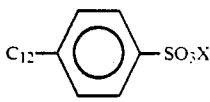

where X is a metal, amine, or ammonia; and
(e) combinations thereof.

11. The product of the process of claim 7.

12. The product of the process of claim 9.

13. A method for inhibiting corrosion in downwell oil field equipment and piping which is in contact with an oil/water medium taken from a producing well by coating said equipment and piping with a formulation consisting of the corrosion inhibitor of the process of claim 7.

14. The method of claim 13 wherein a carrier solvent is added to disperse the inhibitor.

15. The method of claim 14 wherein the carrier solvent is selected from the group consisting of water, alcohol, hydrocarbon-based solvents, and combinations thereof.

16. A method for inhibiting corrosion in downwell oil field equipment and piping which is in contact with an oil/water medium taken from a producing well by coating said equipment and piping with a formulation consisting of the corrosion inhibitor and surfactant admixture of the process of claim 9.

17. The method of claim 16 wherein a carrier solvent is added to disperse the inhibitor.

18. The method of claim 17 wherein the carrier solvent is selected from the group consisting of water, alcohol, hydrocarbon-based solvents, and combinations thereof.

19. The process of claim 5 wherein the polybasic acid is selected from the group consisting of $C_{16}$-$C_{36}$ dimerized fatty acids, $C_{24}$-$C_{54}$ trimerized fatty acids, and combinations thereof.

20. The process of claim 5 wherein the polyalcohol is selected from the group consisting of ethylene glycol, diethylene glycol, triethylene glycol, polyethylene glycol, glycerin, sorbitol, pentaerythritol, trimethylolpentane, and combinations thereof.

21. The process of claim 5 which comprises employing a surfactant or combination of surfactants in an admixture with said corrosion inhibitor.

22. The process of claim 21 wherein the surfactant is selected from the group consisting of:
(a) fatty acid ethoxylates having a chemical structure of

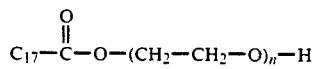

where n is an integer between 4 and 20;
(b) nonylphenol ethoxylates having a chemical structure of

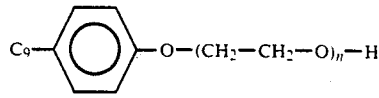

where n is an integer between 4 and 20;
(c) alcohol ethoxylates having a chemical structure of

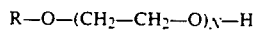

where R is $C_{12}$-$C_{18}$ and n is an is an integer between 4 and 20;
(d) dodecylbenzenesulfonates having a chemical structure of

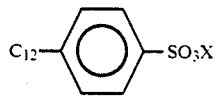

where X is a metal, amine, or ammonia; and
(e) combinations thereof.

23. The product of the process of claim 21.

24. A method of inhibiting corrosion in downwell oil field equipment and piping which is in contact with an oil/water medium taken from a producing well by coating said equipment and piping with a formulation consisting of the corrosion inhibitor and surfactant admixture of the process of claim 21.

25. The method of claim 24 wherein a carrier solvent is added to disperse the inhibitor.

26. The method of claim 25 wherein the carrier solvnet is selected from the group consisting of water, alcohol, hydrocarbon-based solvents, and combinations thereof.

27. The product of the process of claim 5 wherein the product is an oil-soluble, highly water-dispersable corrosion inhibitor.

28. The product of claim the process of claim 5 wherein the product is an oil-dispersible, water-soluble corrosion inhibitor.

29. A method for inhibiting corrosion in downwell oil field equipment and piping which is in contact with an oil/water medium taken from a producing well by coating said equipment and piping with a formulation consisting of the corrosion inhibitor of the process of claim 5.

30. The method of claim 29 wherein a carrier solvent is added to disperse the inhibitor.

31. The method of claim 30 wherein the carrier solvent is selected from the group consisting of water, alcohol, hydrocarbon-based solvents, and combinations thereof.

* * * * *

UNITED STATES PATENT AND TRADEMARK OFFICE
CERTIFICATE OF CORRECTION

PATENT NO. : 5,174,913
DATED : December 29, 1992
INVENTOR(S) : John A. Alford et al It is certified that error appears in the above-indentified patent and that said Letters Patent is hereby corrected as shown below:

In column 5, line 3, delete "94 C" and substitute therefor --94°C--.

In column 6, line 55, delete "9.4%" and substitute therefor --19.4%--.

In column 6, line 59, delete "0.0%" and substitute therefor --70.0%--.

In column 7, line 56, delete "0.0%" and substitute therefor --70.0%--.

In column 8, line 40, delete "9.4%" and substitute therefor --19.4%--.

In column 8, line 44, delete "0.0%" and substitute therefor --70.0%--.

UNITED STATES PATENT AND TRADEMARK OFFICE
CERTIFICATE OF CORRECTION

PATENT NO. : 5,174,913
DATED : December 29, 1992
INVENTOR(S) : John A. Alford et al It is certified that error appears in the above-indentified patent and that said Letters Patent is hereby corrected as shown below:

In column 8, line 47, delete "2.5%" and substitute therefor --12.5%--.

In column 10, claim 6, line 50, delete "p1".

In column 12, claim 28, line 63, delete the first occurrence of "claim".

Signed and Sealed this

Twelfth Day of October, 1993

Attest:

BRUCE LEHMAN

Attesting Officer

Commissioner of Patents and Trademarks